United States Patent

[11] 3,629,753

[72] Inventors Ushio Kawabe;
Mitsuhiro Kudo; Masato Ishibashi; Toshio Doi, all of Tokyo-to, Japan
[21] Appl. No. 57,240
[22] Filed July 23, 1970
[45] Patented Dec. 21, 1971
[73] Assignee Hitachi, Ltd.
Tokyo, Japan
[32] Priority July 23, 1969
[33] Japan
[31] 44/57703

[54] MAGNETIC FLOATING DEVICE USING HARD SUPERCONDUCTOR
12 Claims, 10 Drawing Figs.

[52] U.S. Cl. .......... 335/216, 308/10
[51] Int. Cl. .......... H01f 7/22
[50] Field of Search .......... 308/10; 335/216

[56] References Cited
UNITED STATES PATENTS
3,026,151 3/1962 Buchhold .......... 308/10
3,378,315 4/1968 Webb .......... 335/216 X

*Primary Examiner*—G. Harris
*Attorney*—Craig, Antonelli, Stewart & Hill

ABSTRACT: A magnetic floating device formed by a plurality of spaced parallel plates made of a nonhomogeneous hard superconductor maintained by cooling means in a superconductive state and subjected to a magnetic field having a gradient in a direction perpendicular to said plates, whereby the magnetic field between the parallel plates is very weak as compared to the applied magnetic field strength.

MAGNETIC FLOATING DEVICE USING HARD SUPERCONDUCTOR

This invention relates to a magnetic floating device, and more particularly to a magnetic floating device which utilizes the magnetic shielding property of an nonhomogeneous hard superconductor.

The term magnetic floating device as used herein denotes a device for lifting or floating an object in the air by virtue of a magnetic force. Among the proposed applications for this device are noncontact bearings, cushions, hovercraft high-speed trains, etc.

Magnetic floating devices so far contrived include those which take advantage of the repulsive force that is exerted between like poles of magnets and those which utilize the Meissner effect of a soft superconductor. But they have had the common disadvantage of providing a poor floating force, and that is why it has been practically impossible to utilize the principles associated with magnetic floating devices to realize such heavyweight structures as hovercraft high-speed trains since conventional techniques to achieve magnetic floating provide insufficient lift.

It is therefore a principal object of this invention to provide a magnetic floating device which has extremely great lifting force.

Another object of the invention is to provide a magnetic floating device of simple construction which produces a stable lifting force.

Other objects, features and advantages of the present invention will be apparent from the following detailed description when read in conjunction with the accompanying drawings in which.

Figure 1:
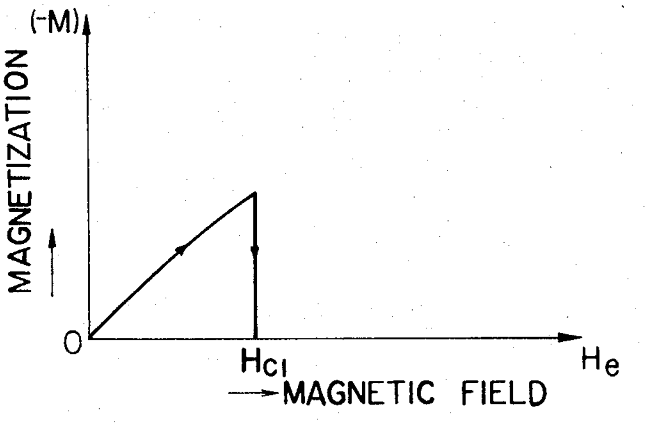
FIGS. 1 and 2 are graphs showing magnetization characteristic curves of superconductors.

In FIG. 1, which is a magnetization curve of a soft superconductor, the magnetic field $H_e$ that is applicable to the soft superconductor is plotted on the abscissa against the magnetization ($-M$) on the ordinate. As can be seen, the soft superconductor is magnetized, upon the application of an external magnetic field, in a reverse direction to the magnetic field (i.e., the superconductor becomes diagrammatic), and the intensity of magnetization is proportional to the intensity of the magnetic field $H_e$. It is observed, however, that at a given value of magnetic field $H_{c1}$ the superconductive state can be broken, so that M becomes zero. The value $H_{c1}$ is known as the lower critical field, and the region of $H_e<H_{c1}$ is known as the perfect-diamagnetic region or Meissner region. In this region a current flows through the surface layer of the soft superconductor about several thousand Angstroms in thickness. As a result, the external magnetic field is prevented from gaining entrance into the soft superconductor and the internal magnetic field is maintained at zero. It is also noted that, if an object whose internal magnetic field is zero is placed in a magnetic field having a given gradient, a certain force is exerted on the object to such an extent that the object will be lifted in the direction toward where the magnetic field becomes smaller. This means that the foregoing principles may be applied in the manufacture of mechanically contactless bearings, cushions, etc.

With a floating device which utilizes the Meissner effect of a soft superconductor as above described, the maximum lifting force, which is expressed as $H_{c1}^2/8$, is limited by the intensity of the lower critical field $H_{c1}$ and cannot be increased beyond a certain value.

The present invention, by contrast, employs a nonhomogeneous hard superconductor and takes advantage of the magnetic shielding effect against the magnetic field between the lower critical field and upper critical field, whereby the device can gain a lifting force nearly several thousand times greater than that of the conventional devices.

Figure 2:
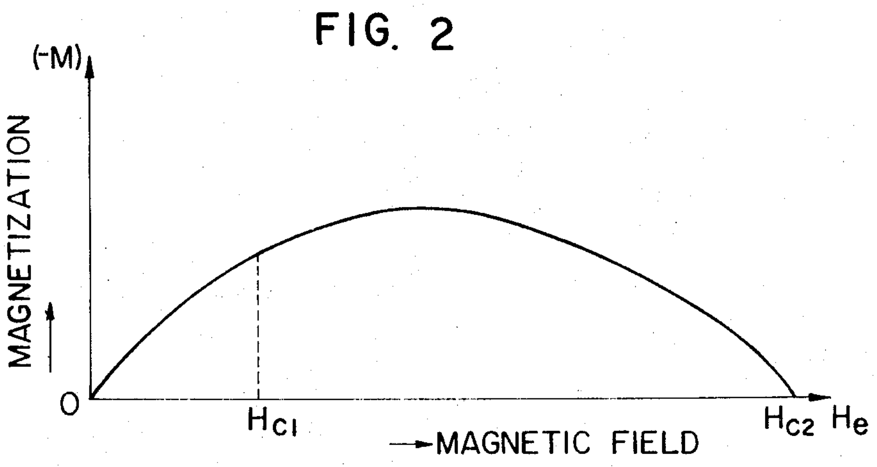

Among nonhomogeneous hard superconductors are, for example, Nb—Zr—Ti, $Nb_3Sn$, $Nb_3Ga$, and $Nb_3(Al_{0.8}Ge_{0.2})$, which invariably have a magnetization characteristic as graphically represented in FIG. 2. If such a hard superconductor is placed in a magnetic field and the field is increased, the magnetizing force ($-M$) will gradually increase until the lower critical field $H_{c1}$ is reached. It will continue to increase to some extent beyond the $H_{c1}$ level from which the external magnetic field begins to predominate, and will start to decline from a certain peak point onward until the value $H_{c2}$, or the upper critical field, is reached, where the superconductive state is destroyed. As opposed to the $H_e<H_{c1}$ region, which is called a Meissner region as referred to above, the region where $H_{c2}>H_e>H_{c1}$ is called the magnetic shielding region. In the latter region, a dilute flux space is produced within a hard superconductor in the field by reason of phenomenon totally different from the Meissner effect. With the pinning force due to dislocation, inadequate precipitation and other defects inside the nonhomogeneous hard superconductor balanced by Lorentz's force which induces a magnetic flux from the external magnetic field to find its way into the hard superconductor, the magnetic flux enters the superconductor through its surface. As a consequence, an induced current flows through the portion into which the magnetic flux has penetrated. It is by this induced current that any further ingress of the flux of external origin into the hard superconductor is prevented and a remarkably diluted flux space is formed inside the superconductor. In this case, the ingression depth of the flux in the superconductor depends on the intensity of the external magnetic field, the depth being usually about $10^6$ times greater than the depth of the surface layer through which a current flows by the Meissner effect. In this way the Meissner effect creates a space of zero magnetic field in the superconductor, whereas the magnetic shielding effect produces a dilute flux space in a superconductor of the same material. Thus, the two naturally have entirely dissimilar magnetic characteristics, but, in either case, the superconductor when placed in a magnetic having a uniform gradient will be subjected to a force in the direction toward which the magnetic field decreases. It may be added that homogeneous hard superconductors are rather undesirable for the practice of this invention because they permit ingress of the flux from a magnetic field of fairly low intensity and fail to achieve a sufficient magnetic shielding effect.

The magnetic shielding effect of a homogeneous hard superconductor will become more apparent from the experiment as described hereunder.

Figure 3:
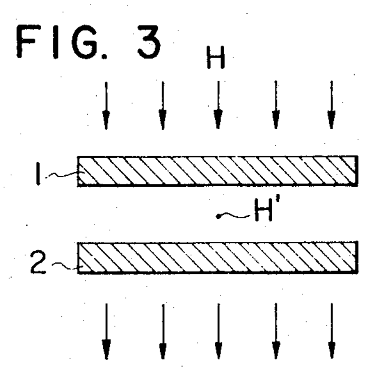
FIG. 3 is a schematic view explanatory of the principles of this invention.
Figure 4:
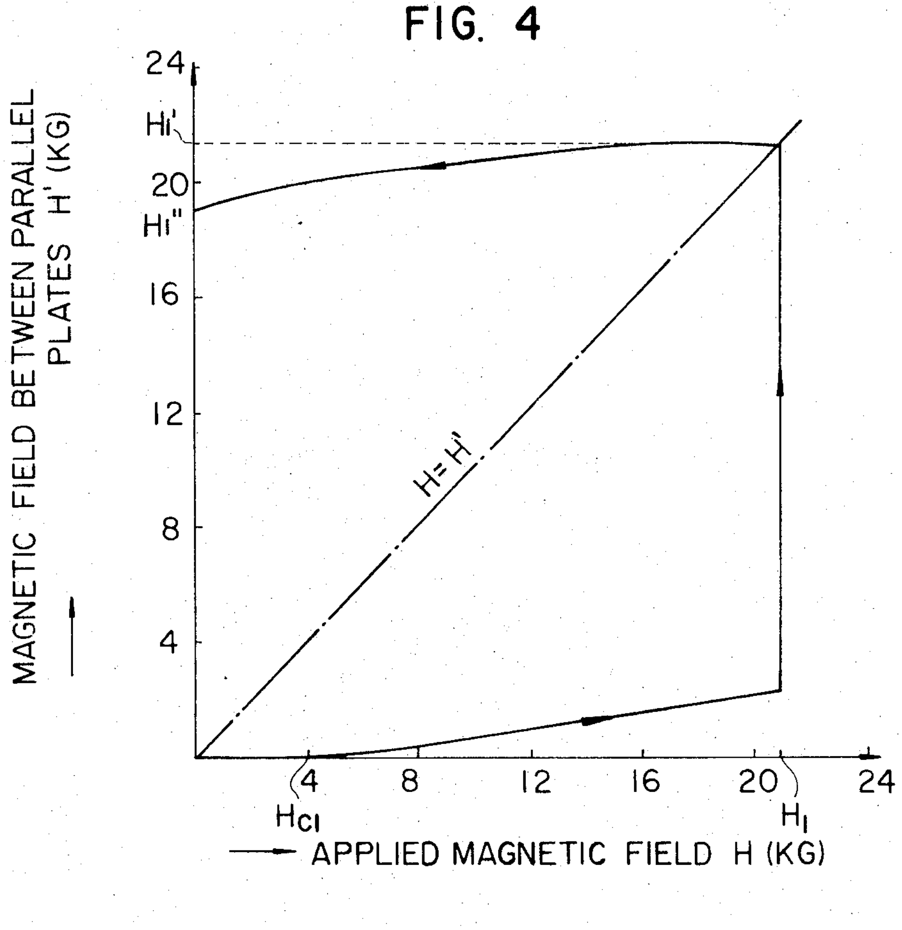
FIG. 4 is a graph showing characteristic curves explanatory of the magnetic shielding effect.

As shown in FIG. 3, two flat plates 1 and 2 of a nonhomogeneous hard superconductor are arranged in parallel to each other, and an external magnetic field H is applied to the parallel plates in a direction perpendicular thereto. The relation between changes of the magnetic field H and the magnetic field H′ defined between the parallel plates may be plotted in the form of a curve as given in FIG. 4. As the applied magnetic field H is increasingly intensified from zero, the field H′ initially undergoes little change and remains nearly zero. This is because the ingress of magnetic flux is prevented by the shielding property of the hard superconductor plates 1 and 2. Upon the arrival of the applied magnetic field H at the critical field $H_{c2}$ of the hard superconductor, the superconductor state is destroyed and the magnetic field H′ between the parallel plates becomes substantially equivalent to the applied field H. If the plates in a certain magnetic field $H_1$ which is below the value $H_{c2}$ are heated together at a temperature above the transition temperature $T_c$ until the relation $H_1=H'$ is established and the applied magnetic field H is gradually reduced to zero, then the internal field H' will not be decreased back to zero but a certain magnetic field $H_1''$ will remain between the parallel plates. In other words, the hard superconductor possesses a magnetic trapping property. Thus, nonhomogeneous hard superconductors have both magnetic shielding and magnetic trapping properties. This invention takes advantage of the former property. In this characteristic curve it is assumed that $H'/H = \gamma$ and $\gamma$ is called the magnetic shielding factor.

For the purpose of the present invention, the maximum lifting force is expressed as $(1 - \gamma)H^2/8\pi$(dyne/cm.$^2$) ($H_{c1}<H<H_{c2}$. Here $H_{c2}$ is the upper critical field as shown in FIG. 2, which has a value about 100 times that of the lower critical field of an ordinary soft superconductor. Moreover, suitable selection of the material makes it possible to obtain a $\gamma$ value close to zero. With all these factors combined, an arrangement such as the device of the present invention, which takes advantage of the magnetic shielding property, can attain a lifting force nearly several thousand times as great as that of conventional devices which utilize the Meissner effect.

For a better understanding of the present invention, a preferred embodiment thereof will be described in detail with reference to the accompanying drawings.

Figure 5:
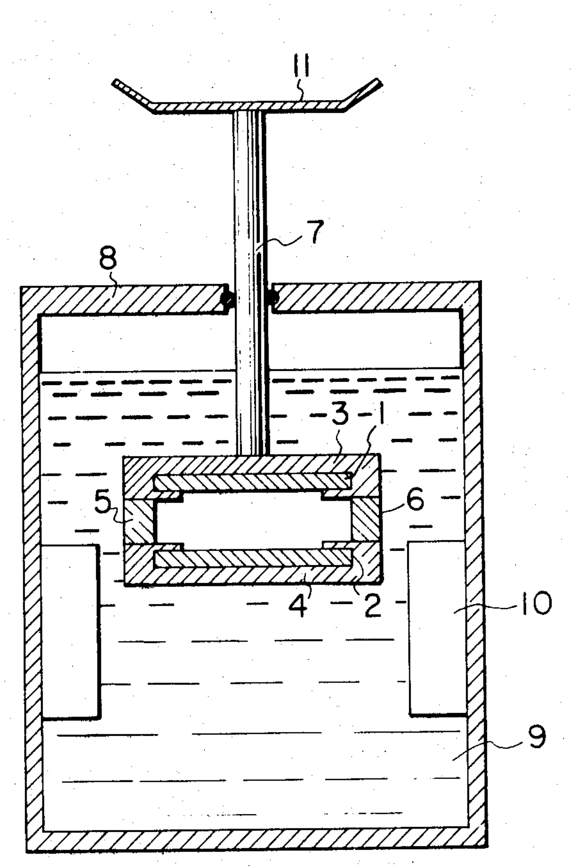
FIG. 5 is a schematic view illustrating an embodiment of the invention.

Referring specially to FIG. 5, a pair of disks 1 and 2 of a nonhomogeneous hard superconductor, e.g., sintered $Nb_3Sn$ (sintering conditions: compression with a pressure of 1 ton/cm.$^2$ and a heat treatment in vacuum at 1,000° C. for 5 hours), each measuring 45 mm. in diameter and 5 mm. in thickness, are parallelly held apart at a distance of 20 mm. Holders 3 and 4 are provided for the disks, and a vertical shaft 7 is secured at the lower end to point generally in the center of the upper holder 3. The disks 1 and 2 are held by spaces 4 and 5 parallelly to each other. The disks in a pair are immersed in liquid helium 9 in a cryogenic Dewar's bottle 8. The opening of the bottle 8 through which the shaft 7 extends is hermetically sealed with Wilson's seal. A superconductive magnet 10 having an inside diameter of 70 mm. and a length of 100 mm. is attached to the inner surrounding wall of the bottle 8. On top of the shaft is supported a pan 11 for carrying an object to be floated up.

Now if a current flows through the superconductive magnet 10, a magnetic field having a gradient in a given direction is formed in the bottle 8. Nevertheless, the magnetic shielding effect of the disks 1 and 2 provides only a very dilute flux space in between. As a result, the assembly consisting of the components 1 and 6 gains a lift, so that the shaft 7 and hence the object on the pan 11 supported by the shaft 7 is lifted.

Figure 6:
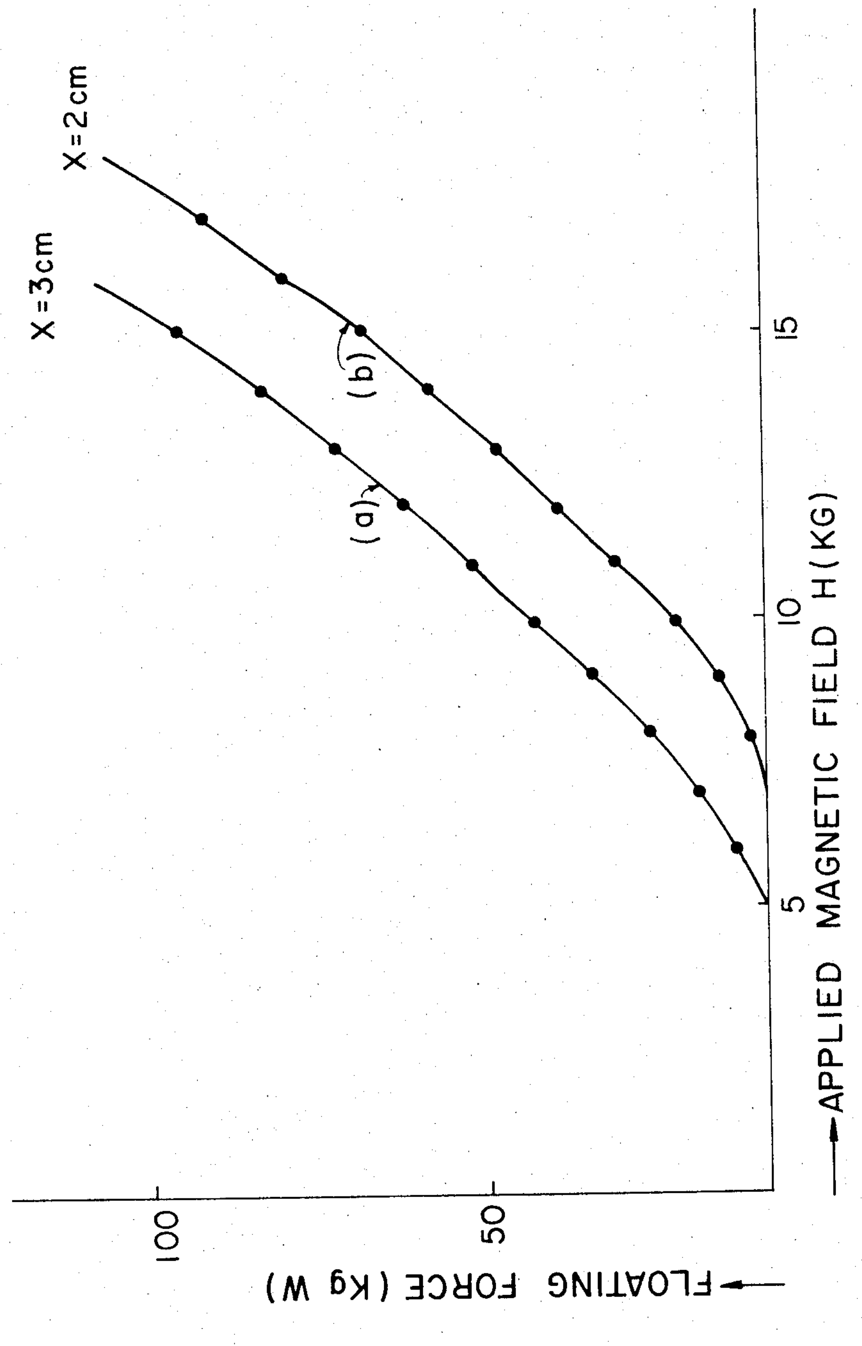
FIG. 6 is a graph showing characteristic curves of lifting force produced by the device of the invention.

When in an experiment a load cell for measuring the lifting force was used instead of the pan 11, results as given in FIG. 6 were obtained. In the graph wherein the applied field (KG) on the surface of the pair of disks is plotted along the abscissa against the lifting force (KG·W) along the ordinate, the curve (a) was obtained when the distance Z between the center of the superconductor magnet 10 and the center of the pair of disks was 3 cm. and the curve (b) was obtained when the distance Z was 2 cm.

Figure 7:
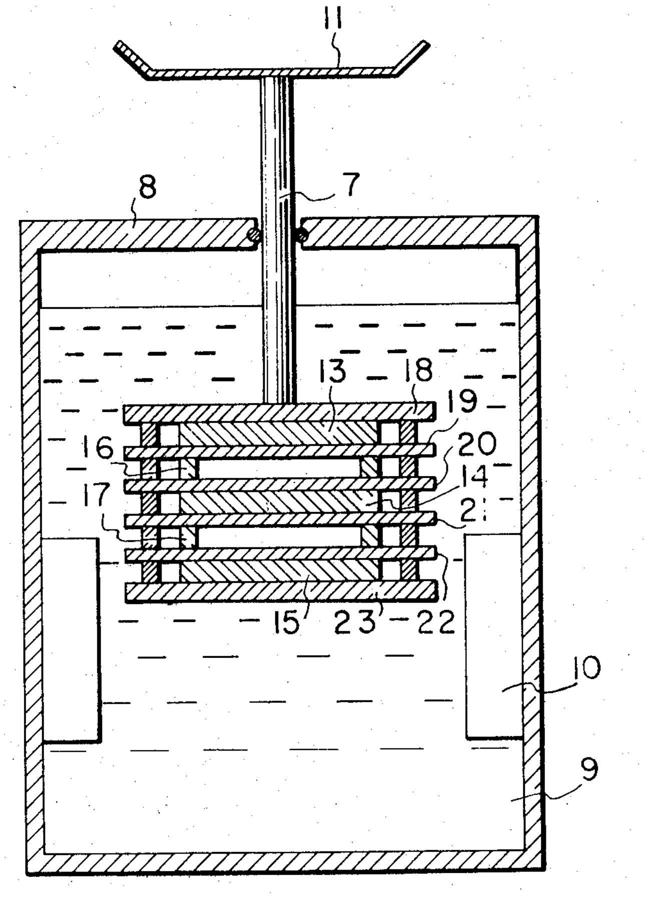
FIGS. 7 and 8 are schematic views of other embodiments of the invention.

FIG. 7 illustrates another embodiment of the invention. Between a parallel pair of disks there is interposed a cylindrical piece of a hard superconductor for added effect of magnetic shielding. In the figure, numerals 13, 14 and 15 indicate disks of a nonhomogeneous hard superconductor, which are held parallelly to one another by holders 18 to 22. Cylindrical hard superconductor cylinders 16 and 17 are provided between the parallelly disposed disks 13, 14, and 15, in order to avoid ingress of any magnetic flux into the space defined between the parallel disks. Thus, the magnetic field between the parallel disks is even more diluted, as compared with the magnetic field that is applied from the outside, than in the device of FIG. 5, and hence a greater lifting force is obtained.

Figure 8:
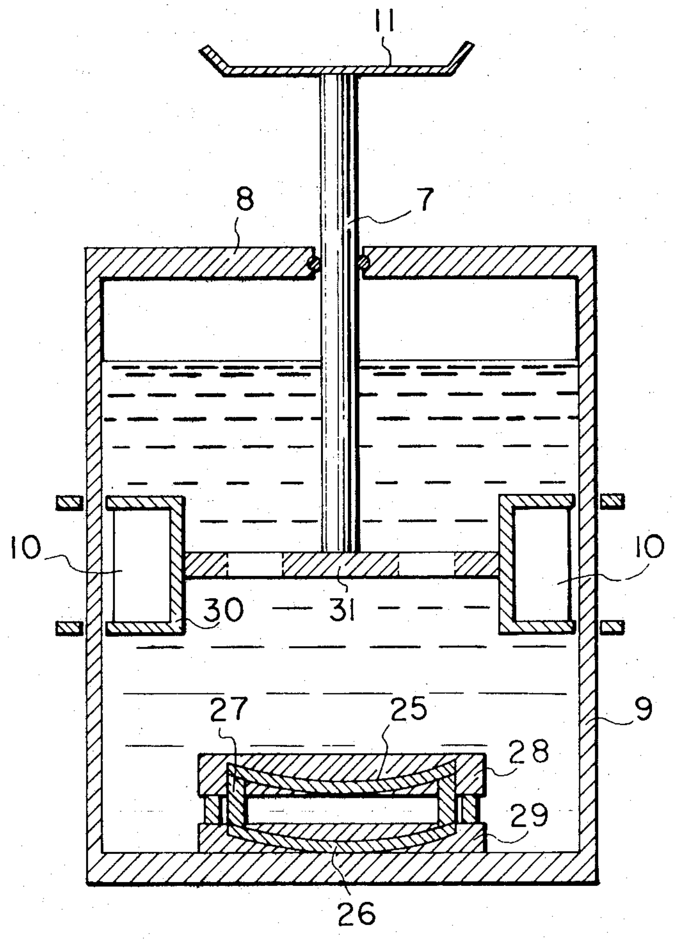

FIG. 8 shows still another embodiment of the invention, wherein a parallel pair of disks of a hard superconductor are fixed and a superconductive magnet is adapted to be moved up and down.

In the figure, disks 25 and 26, both having similarly curved sections, are held in parallel spaced relationship by holders 28 and 29. Between the disks is interposed a cylinder 27 of a hard superconductor, and this assembly is secured to the bottom of a cryogenic Dewar's bottle 8. A superconductive magnet 10 in this embodiment is slidably held along the inner side wall of the bottle 8 by means of a holder 30, which inturn is connected by a disk 31 to a shaft 7.

In this case, the superconductive magnet 10 is moved up and down and hence an object of a pan 11 is lifted by the force that is exerted between the assembly of components 25 through 29 and the superconductive magnet 10. Entirely the same effect as achieved by the devices shown in FIGS. 5 and 7 is thus attained.

In the device shown in FIG. 8, the hard superconductor disks 25 and 26 are curved because the superconductive magnet 10 is thereby enabled to apply the magnetic flux vertically to the disks and exert a great force on the disk assembly. In the embodiment under consideration, the magnet 10 may be a plurality of magnets combined to form a desired magnetic field for floating purposes.

Figure 9:
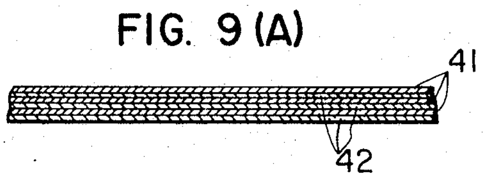
FIGS. 9A and 9B are diagrammatic views of disks to be used in the practice of the invention.

While porous sintered $Nb_3Sn$ disks are used in the embodiment just described, large superconductor plates may sometimes fail temporarily to provide a lift because of insufficient cooling capacity, flux jump and other defects. As a way of avoiding this failure, a cooling arrangement may be adopted in which the surface area of the superconductor exposed to a refrigerant such as liquid helium or cold helium gas is increased. Another approach to the problem is to form a composite plate, as shown in FIG. 9A, which consists of disk-shaped sheets of a nonhomogeneous hard superconductor plated or deposited with a normal conductor material (e.g., Ag, Cu, or Au) having a high thermal diffusivity K/C (where K = thermal conductivity, C = specific heat), and disk-shaped foils 42 of a normal material, placed simply in alternate layers. The composite plate is featured by improved thermal contact between the components 41 and 42 and by increased cooling capacity.

Figure 9B:
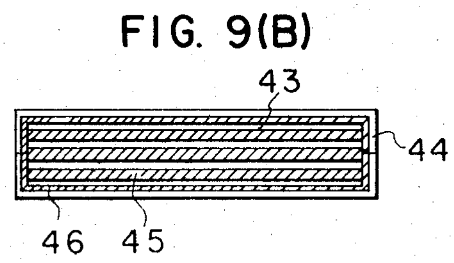

Fairly stable lifting was attained by the use of a multilayer Nb—$Nb_3Sn$—Nb disk formed by the diffusion method. The multilayer disk was constructed with a section as shown in FIG. 9B, by forming a 40$\mu$ thick Sn layer 46 on the inner surface of two 40 $\mu$ thick trays or halves of a cylindrical contained 44 of Nb, thoroughly cleaning the surface of the Sn layer, placing Nb disks 43 and Sn disks 45 one upon another over the Sn layer, compressing them altogether by mechanical means, placing the laminate in the cylindrical container, and then subjecting the assembly to a diffusion heat treatment in vacuum or in an atmosphere of inert gas at a temperature between 900° and 1,000° C. for a period of 5 to 10 hours, thereby producing $Nb_3Sn$ compound layers along the boundaries between the component layers 43 and 45, and between the component layers 44 and 46.

As will be obvious from the foregoing description, this invention takes advantage of the magnetic shielding effect between the lower critical field and the upper critical field of a nonhomogeneous hard superconductor, and specifically provides a device wherein a magnetic field having a certain gradient is formed by a superconductive magnet and either a spaced assembly surrounding the hard superconductor or a unit body of the hard superconductor is placed in the magnetic field, so that the magnetic field in the space or inside the hard superconductor is diluted by $(1-\gamma)$ H of the applied magnetic field H thereby to provide a lifting force. The present invention thus makes it possible to produce a much greater lift than may be achieved by conventional devices, and moreover, the structure is simplified to a practical advantage. Furthermore, the embodiment above described permits floating in the direction where the magnetic field is reduced, but is stable in the radial direction and conditionally stable in the moving direction as the lift is balanced with the gravity of the object being lifted. These properties are quite contrary to those of a ferromagnetic material and represent an advantageous feature of this invention.

We claim:

1. A magnetic floating device comprising a. a plurality of plates of a nonhomogeneous hard superconductor each having a lower critical field and an upper critical field;

b. supporting means for holding said plates in parallel spaced relationship;

c. cooling means for maintaining said plates in a superconductive state; and d. means for applying a magnetic field having a predetermined gradient on said plates in a direction perpendicular thereto, whereby the magnetic field between the parallel plates is rendered dilute as compared with the applied magnetic field and, hence, the plates and the supporting means therefore are displaced in said field with respect to the field-applying means.

2. A magnetic floating device according to claim 2, wherein the strength of the magnetic field that is applied to said plates in the direction perpendicular thereto corresponds to a value between the lower critical field and the upper field of the hard superconductor constituting said plates.

3. A magnetic floating device according to claim 1, wherein a member of a nonhomogeneous hard superconductor is interposed between the parallel plates in such a manner as to surround the space in between.

4. A magnetic floating device according to claim 1, wherein said parallel plates consist of thin layers of a nonhomogeneous, hard superconductor and layers of a normal conductive material alternately laminated together.

5. A magnetic floating device according to claim 1, wherein means are provided for fixing said means for applying a magnetic field in position, so that said plates are capable of movement in said magnetic field with respect thereto.

6. A magnetic floating device according to claim 1, wherein means are provided for fixing said plates in position, so that said means for applying a magnetic field is capable of movement with respect thereto.

7. A magnetic floating device according to claim 1, wherein said parallel plates are curved arcuately.

8. A magnetic floating device according to claim 1, wherein three flat plates of nonhomogeneous hard superconductor are disposed in spaced parallel relationship, a cylinder of similar material to said plates disposed between each pair of plates so as to enclose the space between plates substantially entirely with superconductor material.

9. A magnetic floating device according to claim 1, wherein said plates are made of a material selected from the group consisting of Nb—Zr—Ti, $Nb_3Sn$, $Nb_3Ga$ and $Nb_3(Al_{0.8}Ge_{0.2})$.

10. A magnetic floating device comprising:

a. a plurality of curved plates of a nonhomogeneous hard superconductor having a lower critical field and an upper critical field;

b. supporting means for holding said curved plates in parallel spaced relationship;

c. cooling means for maintaining said curved plates in a superconductive state;

d. means for applying an external magnetic field having a value between the lower critical field and the upper critical field on the curved plates in the direction perpendicular to the curved surface thereof; and e. means for holding the assembly consisting of the curved plates and supporting means therefore and the external magnetic field applying means, in such a manner that either the assembly or the supporting means is fixed and the other is movable.

11. A magnetic floating device according to claim 10, wherein a member of a nonhomogeneous hard superconductor is interposed between the parallel plates in such a manner as to surround the space in between.

12. A magnetic floating device according to claim 10, wherein said plates are made of a material selected from the group consisting of Nb—Zr—Ti, $Nb_3Sn$, $Nb_3Ga$ and $Nb_3(Al_{0.8}e_{0.2})$.

* * * * *